United States Patent Office 2,725,414
Patented Nov. 29, 1955

2,725,414
OXYGEN-SOFTENING OF RUBBER

Edward M. Bevilacqua, Allendale, N. J., assignor to United States Rubber Company, New York, N. Y., a corporation of New Jersey No Drawing. Application March 26, 1953,
Serial No. 344,907

5 Claims. (Cl. 260—739)

This invention relates to accelerating the oxygen-softening of rubber in latex form.

It is known that the absorption of oxygen by rubber latex will soften or break down the rubber and that adhesives may be prepared by sufficient oxidation of the latex. The oxidation of rubber in latex by a gas containing free-oxygen, however, is a relatively slow process, even in the presence of known accelerators for such oxidative breakdown of the rubber, e. g., aromatic hydrazines and metal salts.

I have found that the absorption of oxygen by latex from a free-oxygen-containing gas is greatly accelerated by the presence in the latex of small amounts of an organic hydroperoxide and an alkylene polyamine.

In carrying out the present invention, Hevea rubber latex is brought into intimate contact with a free-oxygen-containing gas, as by agitating in a closed vessel connected to a supply of oxygen, in the presence of an organic hydroperoxide in which an oxygen of the hydroperoxide radical is attached to a tertiary carbon atom, and an alkylene polyamine. The temperature of the treatment is not critical. Temperatures from 15° C. to 50° C. are generally satisfactory, but higher temperatures to 90° C. may be used. The treatment with the oxygen is continued until the desired extent of rubber softening or oxygen absorption has been accomplished. Any desired amount of oxygen can be absorbed to give the desired softening of the rubber. Usually, however, the absorption of 2 to 30 millimoles of oxygen per 100 grams of solids of the latex is in the practical range. This gives appreciable softening of the rubber with the lower amounts of absorbed oxygen and a highly broken down rubber and an adhesive latex with the higher amounts of absorbed oxygen within this range. The extent of softening may be controlled by adjustment of the amounts of hydroperoxide used so that the hydroperoxide is exhausted when the desired softening stage has been reached, or the addition of a small amount, e. g., 0.1 to 0.5% of the weight of the solids in the latex, of ethylenediamine tetraacetic acid (preferably in the form of an alkali salt), when the desired softening stage has been reached will deactivate any residual hydroperoxide. The oxygen in the free-oxygen-containing gas may be at any desired pressure, e. g. from a partial pressure of 0.1 atmosphere or less, to 25 or more atmospheres. Conveniently the oxygen pressure is one atmosphere, or the 0.2 atmosphere partial pressure of oxygen in an air supply at one atmosphere pressure. Oxygen at a pressure of substantially one atmosphere is at present preferred. The latex is conveniently an alkaline natural rubber latex, e. g. an ammonia-preserved Hevea latex of normal solids content or an ammonia-preserved concentrated Hevea latex from a centrifuging or chemical creaming operation.

The amounts of organic hydroperoxide and alkylene polyamine used to accelerate the oxygen absorption and softening of the rubber are not critical; amounts from 0.05 to 5 per cent of the weight of solids in the latex of the hydroperoxide and of the polyamine are satisfactory. Examples of organic hydroperoxides that may be used are:

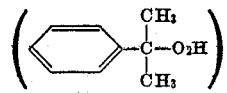
Cumene hydroperoxide

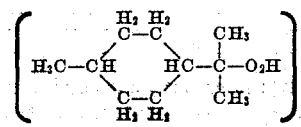
p-Menthane hydroperoxide

p-Cymene hydroperoxide

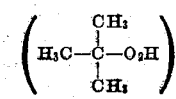
t-Butyl hydroperoxide

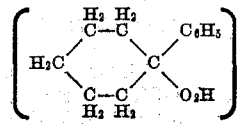
Cyclohexyl benzene hydroperoxide

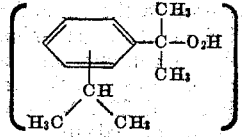
Diisopropyl benzene hydroperoxide

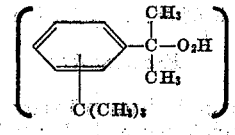
t-Butyl isopropyl benzene hydroperoxide

Examples of alkylene polyamines that may be used are ethylene diamine and the polyethylene polyamines. The preferred alkylene polyamines are those having the general formula: $NH_2(CHR_1CHR_2NH)_xH$ where $R_1$ and $R_2$ are aliphatic or hydrogen, and $x$ is an integer from one to six.

The following examples are illustrative of the invention. All parts and percentages referred to herein are by weight.

Example I

To a commercial centrifuged Hevea rubber latex concentrate of 62.5% total solids preserved with 0.6% of ammonia based on the latex, was added 0.6% of ethylenediamine (as a 20% aqueous solution) based on the weight of solids of the latex, and 0.8% of cumene hydroperoxide (as a 20% aqueous emulsion) based on the weight of solids of the latex. The latex was then agitated in a closed vessel in an atmosphere of oxygen at 30° C. and a pressure of one atmosphere. The absorption of oxygen (millimoles of oxygen absorbed per 100 grams of solids of the latex) over a period of two hours is shown in the following table:

| Time (minutes) | Millimoles of Oxygene Absorbed per 100 Grams Solids of the Latex |
|---|---|
| 0 | 0 |
| 20 | 0.4 |
| 40 | 0.9 |
| 60 | 2.2 |
| 90 | 5.7 |
| 110 | 7.7 |
| 120 | 8.5 |

At the end of two hours ethylenediamine tetraacetic acid (0.16% of the weight of solids of the latex) was added to the latex as a solution in dilute aqueous ammonia (i. e. in the form of the tetrammonium salt) and agitation in the presence of oxygen continued. The rate of absorption of oxygen fell off rapidly, substantially to zero, within ten minutes after the ethylenediamine tetraacetic acid addition. At 130 minutes, 150 minutes and 180 minutes, the oxygen absorption was 8.8 millimoles of oxygen per 100 grams of solids of the latex, showing complete inhibition or deactivation of the polyamine-hydroperoxide accelerator. To illustrate the tremendous acceleration of oxygen absorption according to the present invention, the oxygen absorption without the ethylene diamine and cumene hydroperoxide in two hours is only 0.04 millimole per 100 grams of solids of the latex.

*Example II*

Samples of the latex of Example I to which 0.6% of ethylenediamine and 0.8% of cumene hydroperoxide based on the latex solids had been added as in Example I, were oxidized by agitating at 30° C. in an atmosphere composed of a mixture of nitrogen and oxygen, at different partial pressures, in the various examples. After an induction period of about ten minutes, the rate of oxygen absorption was constant for about three hours, after which it fell off slowly. At partial pressures of oxygen of 737, 592, 441, 296, 147 and 72 millimeters of mercury, the rates of oxidation over the constant (maximum) rate period were, respectively, 5.3, 4.6, 3.1, 1.7, 1.1 and 0.9 millimoles of oxygen absorbed per 100 milligrams of solids of the latex per hour.

*Example III*

Various samples of the latex of Example I were oxidized under the same conditions as in Example I for different times, i. e., to different oxygen absorptions. To stop further softening when the desired amount of oxygen had been absorbed, 0.16% of ethylenediamine tetraacetic acid based on the latex solids (as a solution in aqueous ammonia) was added as in Example I. The samples were then dried and the amount of softening was determined by Mooney viscosity measurements. Mooney viscosity measurements are well known in the rubber industry where they are used as standards of measurement of the viscosity of rubbers. Mooney viscosity measurements are made on a Mooney Shearing Disc Plastometer or Viscometer. This instrument has been described by M. Mooney in Industrial & Engineering Chemistry (Anal. Ed.) 6, 147 (1934). By means of this device, the viscosity of a plastic material in shear may be quantitatively measured. The viscosity readings are based on an arbitrary standard: the lower the readings, the lower is the viscosity, and hence the greater is the plasticity. The Mooney viscosity readings in the table below were measured with the large rotor supplied with the instrument, after 4 minutes between the platens of the instrument at 212° F., a one minute warm-up period being used. This is a standard measurement—A. S. T. M. Standards on Rubber Products D–927–49 T. Such Mooney viscosity readings are designated as "ML–4" Mooney viscosities, meaning Mooney viscosity (M), using large rotor (L) with 4 minutes between the platens (4). The progressive absorption and softening of the rubber are shown in the following table:

| Time Oxidized (minutes) | Millimoles of Oxygen Absorbed per 100 grams of Solids of the Latex | ML–4 (212° F.) |
|---|---|---|
| 0 | 0 | 105 |
| 60 | 2.1 | 80 |
| 80 | 4.5 | 66 |
| 88 | 6.3 | 55 |
| 120 | 8.9 | 40 |
| 130 | 11.5 | 30 |
| 200 | 15.0 | 20 |

The degree of softening of the rubber is a direct function of the amount of oxygen absorbed.

*Example IV*

To separate samples of the latex of Example I were added 0.4% of cumene hydroperoxide based on the weight of the latex solids, and one of the following ethylene polyamines in each sample: ethylenediamine, diethylenetriamine, triethylene tetramine, tetraethylene pentamine, and pentaethylene hexamine. The amounts of the ethylene polyamines used were 0.3, 0.55, 0.8, 1.0, and 1.2% respectively, all based on the latex solids. The latices were oxidized under the same conditions as Example I. The maximum rates of oxidation (taken from curves) in a three hour treatment with oxygen at one atmosphere at 30° C. for the various ethylene polyamines were, respectively, 3.4, 3.7, 8.8, 11.5 and 7.3 millimoles of oxygen absorbed per 100 grams of latex solids per hour.

*Example V*

The process of the present invention is more rapid at higher temperatures. A sample of the latex of Example I was oxidized under the same conditions as in Example I, using 0.25% of cumene hydroperoxide and 0.15% of triethylene tetramine based on the latex solids at 50° C. This latex absorbed 9 millimoles of oxygen per 100 grams of latex solids in approximately 9 minutes.

*Example VI*

The following are examples of the present invention using various organic hydroperoxides. Separate samples of the latex of Example I were oxidized under the same conditions as in Example I, using 0.3% of ethylenediamine and amounts of various other organic hydroperoxides which were the molar equivalent of 0.8% of cumene hydroperoxide based on the latex solids. In a three hour treatment, the maximum rate of oxygen absorption with the cumene hydroperoxide was 5 millimoles of oxygen absorbed per 100 grams of latex solids per hour. The maximum rates of absorption with p-menthane hydroperoxide, p-cymene hydroperoxide, diisopropyl benzene hydroperoxide, and t-butyl isopropyl benzene hydroperoxide were 5.4, 5.7, 5.0 and 3.9 millimoles of oxygen absorbed per 100 grams of latex solids per hour respectively.

*Example VII*

The organic hydroperoxide and the ethylene polyamine must both be present for the very rapid oxidation according to the present invention. To a sample of the latex of Example I was added 0.8% of cumene hydroperoxide, based on the latex solids, without an alkylene polyamine. To a second sample of the latex of Example I was added 0.4% of triethylene tetramine, based on the latex solids, without an organic hydroperoxide. To a third sample of the latex of Example I was added 0.4% of cumene hydroperoxide and 0.15% of triethylene tetramine, both based on the latex solids. An untreated sample of the latex and the three samples treated as above were oxidized by agitating in closed vessels in an atmosphere of oxygen at one atmosphere pressure at 50° C., for two hours. The maximum rate of oxygen absorption for the untreated sample was 0.13 millimole of oxygen per 100 grams of latex solids per hour. The maximum rates of oxygen absorption of the samples treated with cumene hydroperoxide only, and with triethylene tetramine only, were 0.34 and 0.28 millimole of oxygen per 100 grams of latex solids per hour, respectively. The maximum rate of oxygen absorption of the latex containing both 0.4% of cumene hydroperoxide and 0.15% of triethylene tetramine was about 55 millimoles of oxygen absorbed per 100 grams of latex solids per hour.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A method of softening rubber in latex form which comprises treating Hevea rubber latex with a free-oxygen-containing gas in the presence of 0.05 to 5% of the weight of the solids of the latex of an organic hydroperoxide in which an oxygen of the hydroperoxide radical is attached to a tertiary carbon atom, and 0.05 to 5% of the weight of the solids of the latex of an alkylene polyamide.

2. A method of softening rubber in latex form which comprises treating Hevea rubber latex with a free-oxygen-containing gas in the presence of 0.05 to 5% of the weight of the solids of the latex of an organic hydroperoxide in which an oxygen of the hydroperoxide radical is attached to a tertiary carbon atom and 0.05 to 5% of the weight of the solids of the latex of an alkylene polyamine, and after absorption of the desired amount of oxygen, adding ethylenediamine tetraacetic acid to the latex.

3. A method of softening ruber in latex form which comprises treating Hevea rubber latex with a free-oxygen-containing gas in the presence of 0.05 to 5% of the weight of the solids of the latex of an organic hydroperoxide in which an oxygen of the hydroperoxide radical is attached to a tertiary carbon atom and 0.05 to 5% of the weight of the solids of the latex of an alkylene polyamine, until absorption of 2 to 30 millimoles of oxygen per 100 grams of solids of the latex.

4. A method of softening rubber in latex form which comprises treating Hevea rubber latex with a free-oxygen-containing gas in the presence of 0.05 to 5% of the weight of the solids of the latex of an organic hydroperoxide in which an oxygen of the hydroperoxide radical is attached to a tertiary carbon atom and 0.05 to 5% of the weight of the solids of the latex of an alkylene polyamine until absorption of 2 to 30 millimoles of oxygen per 100 grams of solids of the latex, and thereafter adding ethylenediamine tetraacetic acid to the latex.

5. A method of softening rubber in latex form which comprises treating Hevea rubber latex with a free-oxygen-containing gas in the presence of 0.05 to 5% of the weight of the solids of the latex of an organic hydroperoxide selected from the group consisting of cumene hydroperoxide, p-menthane hydroperoxide, p-cymene hydroperoxide, t-butyl hydroperoxide, cyclohexyl benzene hydroperoxide, diisopropyl benzene hydroperoxide and t-butyl isopropyl benzene hydroperoxide, and 0.05 to 5% of the weight of the solids of the latex of an ethylene polyamine selected from the group consisting of ethylene diamine, diethylene triamine, triethylene tetramine, tetraethylene pentamine and pentaethylene hexamine.

References Cited in the file of this patent

UNITED STATES PATENTS

| | | |
|---|---|---|
| 2,430,481 | St. Mleux | Nov. 11, 1947 |
| 2,558,527 | Rumscheidt et al. | June 26, 1951 |

OTHER REFERENCES

Whitby et al.: Ind. & Eng. Chem., vol. 42, No. 3, March 1950, pages 445–456.